United States Patent
Sawa

(10) Patent No.: US 6,857,495 B2
(45) Date of Patent: Feb. 22, 2005

(54) INFLATABLE EXTERNAL AIRBAG SYSTEM

(75) Inventor: Tomohiro Sawa, Tokyo (JP)

(73) Assignee: Takata Corporation, Tokyo (JP)

( * ) Notice: Subject to any disclaimer, the term of this patent is extended or adjusted under 35 U.S.C. 154(b) by 28 days.

(21) Appl. No.: 10/064,973

(22) Filed: Sep. 5, 2002

(65) Prior Publication Data

US 2003/0042714 A1 Mar. 6, 2003

Related U.S. Application Data

(60) Provisional application No. 60/317,179, filed on Sep. 6, 2001.

(30) Foreign Application Priority Data

Feb. 1, 2002 (JP) ........................... 2002-025881

(51) Int. Cl.[7] .............................................. B60R 21/34
(52) U.S. Cl. ............... 180/274; 280/730.1; 296/187.04; 296/193.11
(58) Field of Search ....................... 280/730.1; 180/271, 180/274; 296/187.04, 193.11; B60R 21/34

(56) References Cited

U.S. PATENT DOCUMENTS

| | | | | |
|---|---|---|---|---|
| 4,249,632 A | * | 2/1981 | Lucchini et al. | 180/274 |
| 6,182,782 B1 | * | 2/2001 | Matsuura et al. | 180/274 |
| 6,386,623 B1 | * | 5/2002 | Ryan et al. | 296/187.04 |
| 6,415,883 B1 | * | 7/2002 | Myrholt et al. | 180/274 |
| 6,467,563 B1 | * | 10/2002 | Ryan et al. | 180/274 |
| 6,474,679 B2 | * | 11/2002 | Miyasaka et al. | 280/730.1 |
| 6,497,302 B2 | * | 12/2002 | Ryan | 180/274 |
| 6,516,278 B1 | * | 2/2003 | Ishizaki et al. | 702/33 |
| 6,712,169 B2 | * | 3/2004 | Ryan et al. | 180/274 |

FOREIGN PATENT DOCUMENTS

| | | | | |
|---|---|---|---|---|
| DE | 27 11 338 A1 | | 9/1978 | |
| EP | 0 967 128 A2 | | 12/1999 | |
| EP | 0 967 128 A3 | | 10/2002 | |
| GB | 2368562 A | * | 5/2002 | ........... B60R/21/34 |
| JP | 7-108903 | | 4/1995 | |
| JP | 7-125606 | | 5/1995 | |
| JP | 7-246908 | | 9/1995 | |
| JP | 8-230610 | | 9/1996 | |
| JP | 8-276816 | | 10/1996 | |
| JP | 9-30368 | | 2/1997 | |

* cited by examiner

*Primary Examiner*—Paul N. Dickson
*Assistant Examiner*—Laura B. Rosenberg
(74) *Attorney, Agent, or Firm*—Fitch, Even, Tabin & Flannery

(57) ABSTRACT

An inflatable external airbag system adapted to securely deploy an airbag along a windshield from a rear portion of a hood with little or no influence of wind direction and/or wind pressure around the top of a running vehicle. The hood includes a front portion and a rear portion. The rear portion includes a deployment direction regulating member. The front and rear portions of the hood may be coupled together via a hinge. As the airbag inflates, the rear hood portion pivots upwardly to a predetermined angle to hang over the airbag just like a flap thereby regulating the deployment direction of the airbag to deflect the deployment toward the windshield.

2 Claims, 8 Drawing Sheets

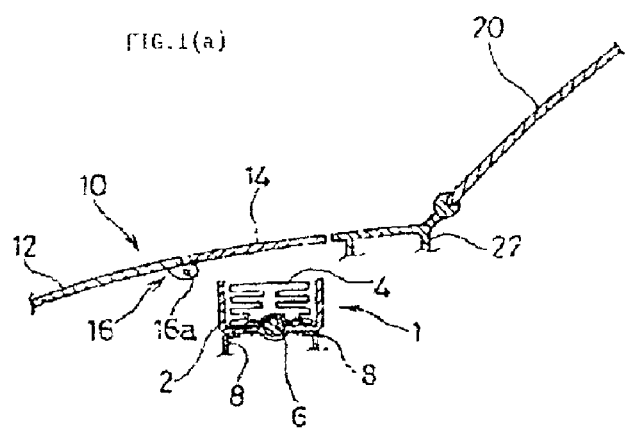

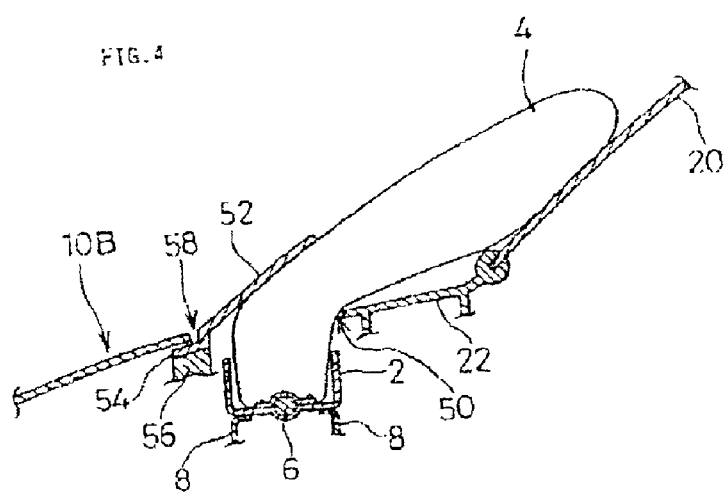

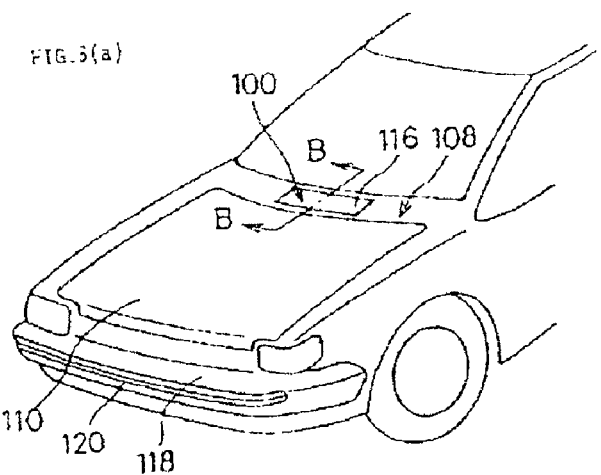

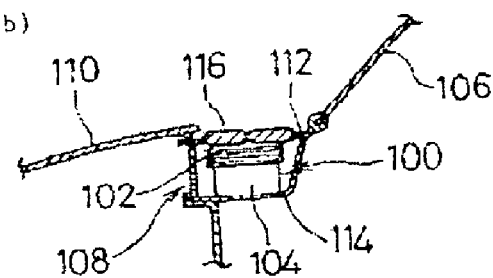

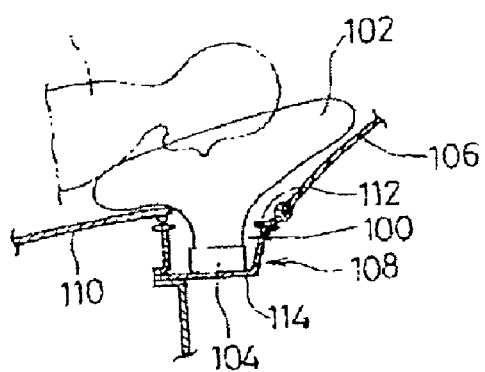

INFLATABLE EXTERNAL AIRBAG SYSTEM

CROSS-REFERENCE TO RELATED PATENT APPLICATIONS

This application claims priority to and the benefit of U.S. Provisional Patent No. 60/317,179, filed Sep. 6, 2001, which is incorporated herein by reference in its entirety.

BACKGROUND OF THE INVENTION

The present invention relates to an inflatable external airbag system of a motor vehicle for protection of people outside of the motor vehicle in the event of a collision between the motor vehicle and a pedestrian, a bicycle, or a motorcycle. The system is configured to prevent the pedestrian, a rider of the bicycle, or a rider of the motorcycle (hereinafter generally referred to as "pedestrian") from directly colliding with a windshield, thereby protecting the pedestrian.

As a motor vehicle collides with a pedestrian, a bicycle, or a motorcycle, the pedestrian, a rider of the bicycle, or a rider of the motorcycle, may be hit at his or her lower body with a front body of the motor vehicle so as to jump onto a hood covering the top of the vehicle front body. As a result, the pedestrian may suffer a secondary collision with the windshield of the motor vehicle.

Japanese Unexamined Utility Model Publication No. H06-74533 discloses an inflatable external airbag system as a pedestrian protective airbag system of which an airbag is deployed from a rear portion of a hood along an outer surface of the windshield, thereby preventing a pedestrian from directly colliding with a windshield of a motor vehicle. Hereinafter, referring to FIGS. 5(a)–5(c), the inflatable external airbag system of this publication will be described.

As shown in FIG. 5(a), the inflatable external airbag system 100 includes an airbag 102, a gas generator (inflator) 104 for inflating the airbag 102. The gas generator 104 is disposed in a cowl top 108, having a container shape, located beneath a windshield (front windscreen glass) 106 of the motor vehicle. The airbag 102 is folded and accommodated in the cowl top 108. The cowl top 108 is adjacent to the rear end (as seen in the longitudinal direction of the vehicle body) of a hood 110 covering the top of the vehicle front body.

The cowl top 108 comprises: a cowl top outer panel 112 exposed on the top of the vehicle front body, a cowl top inner panel 114 composing the bottom of the cowl top 108. The cowl top outer panel 112 is provided with an opening for allowing the airbag 102 to be deployed over the top of the vehicle front body. The opening is positioned above the airbag 102 accommodated in the cowl top 108. In the normal state, a lid 116 is disposed to close the opening.

The front end of the motor vehicle such as a front bumper 118 is provided with a contact detection sensor 120 for sensing a collision between the motor vehicle during running and a pedestrian, a bicycle, or a motorcycle. In the inflatable external airbag system 100 is structured so that, as the contact detection sensor 120 senses the collision, the gas generator 104 is triggered to introduce gas into the airbag 102, thereby inflating the airbag 102.

As the motor vehicle equipped with the inflatable external airbag device 100 collides with a pedestrian, a bicycle, or a motorcycle, the contact detection sensor 120 senses the collision, gas is introduced from the gas generator 104 to the inside of the airbag 102, thereby inflating the airbag 102. Then, the airbag 102 pushes to open the lid 116 attached to the opening of the cowl top 108 to expand over the top of the vehicle front body and is deployed from the rear portion of the hood 110 along the outer surface of the windshield 106 as shown in FIG. 5(c).

Therefore, even if the pedestrian, who is hit onto the hood 110 as a result of the collision with the motor vehicle, plunges into the windshield 106, the airbag 102 receives the pedestrian and thus prevents the pedestrian from directly colliding with the windshield 106.

In the inflatable external airbag system 100, the airbag 102 is easily affected by wind direction and wind pressure because the airbag 102 is exposed to air around the top of the front body of the running vehicle when the airbag 102 is deployed from the rear portion of the hood 110 along the outer surface of the windshield 106. Accordingly, it may sometimes be difficult to deploy the airbag 102 into a desired position.

SUMMARY OF THE INVENTION

It is an object of the present invention to provide an inflatable external airbag system which can securely deploy its airbag into a desired position with little or no influence of wind direction and/or wind pressure around the top of a vehicle.

According to an embodiment of the present invention, an inflatable airbag system is provided. The system includes an airbag which can be deployed from a rear portion of a hood along an outer surface of a windshield of a motor vehicle and includes a deployment direction regulating member which hangs over the airbag, being deployed, from the front side of the motor vehicle to deflect the deployment of the airbag toward the windshield.

According to the embodiment of the present invention mentioned above, the deployment direction regulating member hangs over the airbag being deployed, from the front side of the vehicle, thereby deflecting the deployment of the airbag toward the windshield. Therefore, the inflatable external airbag system can securely deploy the airbag into a desired position with little or no influence of wind direction and/or wind pressure around the top of a vehicle during running.

In the inflatable external airbag system of the present invention, it is preferable that the deployment direction regulating member composes a rear portion of a hood of the motor vehicle and opens upwardly according to the deployment of said airbag.

According to the structure mentioned above, in the normal state, the deployment direction regulating member is not conspicuous and thus never spoils the appearance of the top surface of the vehicle front body. In addition, the deployment direction regulating member can ensure the deployment of the airbag from the rear portion of the hood along the outer surface of the windshield.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 1(a), 1(b) are sectional views of a front body of a motor vehicle equipped with an inflatable external airbag system according to an embodiment of the present invention. FIG. 1(a) shows a normal state of the inflatable external airbag system and FIG. 1(b) shows a state with a deployed airbag of the inflatable external airbag system.

FIG. 4 is a sectional view showing a front portion of a motor vehicle equipped with an inflatable external airbag system according to a still another embodiment of the present invention.

FIG. 5(a) is a perspective view of a front body of the motor vehicle equipped with the inflatable external airbag system, FIGS. 5(b), 5(c) are sectional views taken along the line B—B of FIG. 5(a). It should be noted that FIG. 5(b) shows a normal state (without a collision between the motor vehicle and pedestrian) of the inflatable external airbag system, FIG. 5(c) shows a state with a deployed airbag of the inflatable external airbag system.

DETAILED DESCRIPTION

Figure 1B:
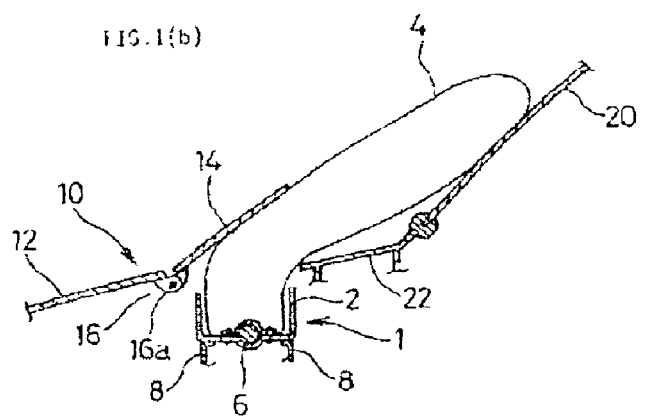

Hereinafter, embodiments of the present invention will be described with reference to the attached drawings. FIGS. 1(a), 1(b) are sectional views of a front body of a motor vehicle equipped with an inflatable external airbag system according to an embodiment of the present invention, wherein FIG. 1(a) shows a normal state of the inflatable external airbag system and FIG. 1(b) shows a state with a deployed airbag of the inflatable external airbag system. In the following description, the term "longitudinal direction" means the fore and aft direction of the motor vehicle.

The inflatable external airbag system 1 comprises: a container-like retainer (airbag holding member) 2 which has an opening to for airbag deployment formed in its top, and an airbag 4 which is normally folded and accommodated in the retainer 2, a gas generator (inflator) 6 for inflating the airbag 4. The airbag system 1 is disposed in a space behind a rear area (in the longitudinal direction of the vehicle) of a hood 10 covering the top of the vehicle front body, wherein the retainer 2 is fixed to a vehicle member (not shown) through a bracket 8.

In this embodiment, the hood 10 comprises a first hood portion (i.e. front hood portion) 12 composing the front half (in the longitudinal direction of the vehicle) as a main portion thereof, and a second hood portion (i.e. rear hood portion) 14, composing the rear half thereof, which is a separate member from the first hood portion 12 and acts as a deployment direction regulating member. The open top of the retainer 2 is normally covered by the second hood portion 14.

The first hood portion 12 is secured as a whole to the vehicle body and the second hood portion 14 is connected to the first hood portion 12 so that the front end of the second hood portion 14 is coupled to the rear end of the first hood portion 12 via a hinge 16. The hinge 16 has a pivot shaft extending in a direction parallel to the width direction of the vehicle. The second hood portion 14 can pivot about the pivot shaft 16a in the vertical direction just like a flap.

The second hood portion 14 normally extends in the horizontal direction to have an upper surface flush with the upper surface of the first hood portion 12 and to cover the open top of the retainer 2. As the airbag 4 starts to be inflated, the second hood portion 14 is pushed by the airbag 4 and thus pivots upwardly about the pivot shaft 16a of the hinge 16 just like a flap so as to open the open top of the retainer 2. At point, the second hood portion 14 hangs over the airbag 4 being deployed, thereby regulating the deployment direction of the airbag 4 to deflect the deployment toward the windshield 20 as shown in FIG. 1(b).

A cowl top 22 is arranged at a location beneath the windshield 20. The cowl top 22 is normally adjacent to the rear end of the second hood portion 14 and has an upper surface flush with the upper surface of the second hood portion 14 (that is, the upper surface of the hood 10).

The front end of the motor vehicle such as a front bumper may be provided with a contact detection sensor for detecting when the motor vehicle collides with a pedestrian, a bicycle, or a motorcycle. The inflatable external airbag system 1 is structured so that, as the contact detection sensor senses the collision, the gas generator 6 is triggered to introduce gas into the airbag 4, thereby inflating the airbag 4.

As the motor vehicle equipped with the inflatable external airbag system 1 collides with a pedestrian, a bicycle, or a motorcycle, the contact detection sensor senses the collision, gas is introduced from the gas generator 6 to the inside of the airbag 4, thereby starting the inflation of the airbag 4. Then, according to the inflation of the airbag 4, the second hood portion 14 pivots upwardly so that the airbag 4 expands upwardly through the open top of the retainer 2. During this, the second hood portion 14 hangs over the airbag 4 being deployed to regulate the deployment direction of airbag 4 to deflect the deployment toward the windshield 20. Therefore, the airbag 4 is guided by the second hood portion 14 so as to be deployed from the rear portion of the hood 10 along the outer surface of the windshield 20.

Therefore, even if the pedestrian, who is hit onto the hood 10 as a result of the colliding with the motor vehicle, plunges into the windshield 20, the airbag 4 deployed from the rear portion of the hood 10 along the outer surface of the windshield 20 receives the pedestrian and thus prevents the pedestrian from directly colliding with the windshield 20.

In the inflatable external airbag system 1, the hood portion 14 as the deployment direction regulating member hangs over the airbag 4 being deployed from the front side of the vehicle so as to regulate the deployment direction of the airbag 4 to deflect the deployment toward the windshield 20. Therefore, the inflatable external airbag system 1 can securely deploy the airbag 4 into a desired position with little or no influence of wind direction and/or wind pressure around the top of a vehicle during running.

Figure 2:
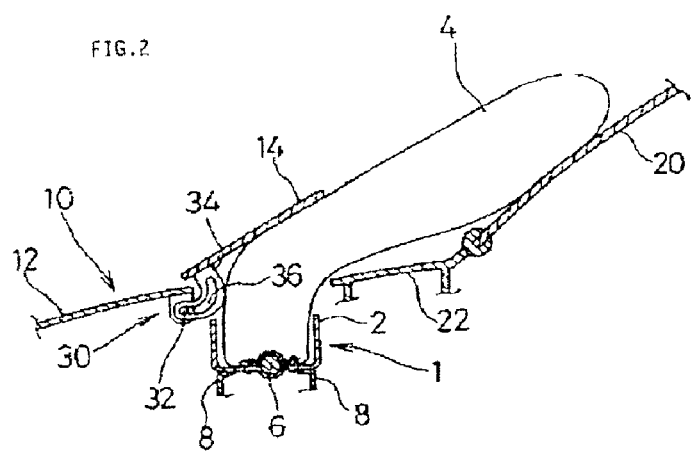
FIG. 2 is a sectional view showing a front portion of a motor vehicle equipped with an inflatable external airbag system according to an another embodiment of the present invention.

In this embodiment, as the hinge for pivotally coupling the front end of the second hood portion 14 and the rear end of the first hood portion 12, various arrangements that can be supposed by persons skilled in the art may be employed. FIG. 2 shows another arrangement of the hinge for the second hood portion 14. FIG. 2 is a sectional view showing a front portion of a motor vehicle equipped with an inflatable external airbag system according to an another embodiment of the present invention, in which the airbag of the inflatable external airbag system is shown in its deployed state. In FIG. 2, elements corresponding or similar to those discussed above with regard to FIG. 1 have the same reference numeral.

In this embodiment, the front end of a second hood portion 14 as the deployment direction regulating member is coupled to the rear end of a first hood portion 12, which composes the front half as a main portion of the hood 10 and is secured as a whole to the vehicle body, via a hinge 30. The hinge 30 has a pivot shaft (not shown) extending in a direction parallel to the width direction of the vehicle just like the aforementioned hinge 16. The second hood portion 14 can pivot about the pivot shaft 16$a$ in the vertical direction just like a flap.

The hinge 30 includes a stopper pin 32 for regulating the opening angle of the second hood portion 14 in the upward direction. The stopper pin 32 projects from the hinge 30 to have its axis extending in a direction parallel to the width direction of the vehicle. The second hood portion 14 is provided with a guide member 34 having a guide groove 36 into which the stopper pin 32 is fitted. As shown in FIG. 2, the guide groove 36 is formed to extend downwardly from a portion near the back of the second hood portion 14 and extend a predetermined length toward the front of the vehicle. In addition the guide groove 36 is curved in an arc of which the center of curvature is said pivot shaft to have a predetermined radius of curvature.

As the airbag 4 starts to be inflated, the second hood portion 14 pivots upwardly about the pivot shaft of the hinge 30 according to the inflation of the airbag 4. During this, the stopper pin 32 moves within the guide groove 36 of the guide member 34 which moves upwardly about the pivot shaft integrally with the second hood portion 14. After that, the stopper pin 32 comes into contact with the rear end (as seen in the moving direction of the guide member 34) of the guide groove 36 so as to stop the pivotal movement of the second hood portion 14. Therefore, the opening angle of the second hood portion 14 is regulated to prevent the second hood portion 14 from further opening even with the pressure from the airbag.

The other components of the inflatable external airbag system 1 and the motor vehicle of this embodiment are the same as those of the aforementioned inflatable external airbag system 1 and the motor vehicle.

Figure 3:
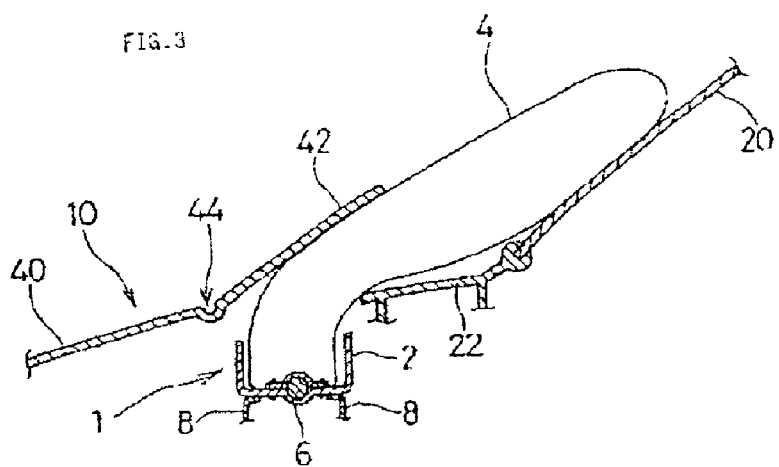
FIG. 3 is a sectional view showing a front portion of a motor vehicle equipped with an inflatable external airbag system according to a further another embodiment of the present invention.

Though the rear half of the hood as the deployment direction regulating member is a separate member from the front half of the hood as the main part and the portions are coupled with each other via the hinge in the aforementioned embodiments, the rear half of the hood as the deployment direction regulating member may be integrally formed with the front half as the main part as shown in FIG. 3. FIG. 3 is a sectional view showing a front portion of a motor vehicle equipped with an inflatable external airbag system according to a further another embodiment of the present invention, in which the airbag of the inflatable external airbag system is shown in its deployed state. In FIG. 3, elements corresponding or similar to those discussed above with regard to FIG. 1 have the same reference numeral.

In this embodiment, a hood 10A is divided into a first area 40 which composes the front half as a main portion thereof and is secured as a whole to the vehicle body and a second area 42 as the deployment direction regulating member which composes a rear portion thereof and continuously extends from the first area 40. The inflatable external airbag system 1 is disposed in a space behind the second hood area 42 of the hood 10A so that the open top of the retainer 2 is covered by the second hood area 42.

A bending guide 44 is formed along the boundary between the first hood area 40 and the second hood area 42 of the hood 10A. The bending guide 44 is composed of a concave or convex groove extending in the width direction of the vehicle.

As the airbag 4 start to inflate, the second hood area 42 is pushed upwardly by the inflation of the airbag 4 and is thus bent at the bending guide 44, whereby the second hood area 42 positioned at the rear side of the bending guide 44 opens upwardly just like a flap.

The second hood area 42 may be connected to another member of the vehicle body with tethers (band-like members) in order to prevent the second hood area 42 from further opening beyond a predetermined angle. The present invention includes those arrangements that can be supposed by persons skilled in the art which may be employed as the arrangement for regulating the opening angle of the second hood area 42.

As the airbag 4 starts to inflate, the second hood area 42 is bent at the bending guide 44 with the pressure from the airbag 4 so as to open upwardly. When the second hood area 42 opens at the predetermined angle, the second hood portion 42 hangs over the airbag 4 from the front side of the vehicle so as to regulate the deployment direction of the airbag 4 to deflect the deployment toward the windshield 20.

The other components of the inflatable external airbag system 1 and the motor vehicle of this embodiment are the same as those of the aforementioned inflatable external airbag system 1 and the motor vehicle shown in FIG. 1.

Though the rear area of the hood is structured as the deployment direction regulating member in the aforementioned embodiments, another member such as the cowl adjacent to the rear portion of the hood may be structured as the deployment direction regulating member as shown in FIG. 4. FIG. 4 is a sectional view showing a front portion of a motor vehicle equipped with an inflatable external airbag system according to a still another embodiment of the present invention, in which the airbag of the inflatable external airbag system is shown in its deployed state. In FIG. 4, elements corresponding or similar to those discussed above with regard to FIG. 1 have the same reference numeral.

In this embodiment, an opening 50 is formed between a hood 10B and a cowl top 22 in order to allow the airbag 4 to expand over the top of the vehicle front body. A cowl 52 as the deployment direction regulating member is arranged to close the opening 50. The inflatable external airbag system 1 is disposed in a space below the opening 50 so that the open top of the retainer 2 is covered by the cowl 52.

A mount bracket 54 is disposed at the front end of the cowl 52. The cowl 52 is connected to a vehicle member (another body member besides the hood 10B) 56 through the mount bracket 54. A bending guide 58 is formed along the corner of the boundary between the mount bracket 54 and the front edge of the cowl 52 to extend in the width direction of the vehicle.

As the airbag 4 starts to be inflated, the cowl 52 receives the pressure from the airbag 4 and is thus bent at the bending guide 58, whereby the cowl 52 positioned at the rear side of the bending guide 58 opens upwardly just like a flap.

When the cowl 52 opens at a predetermined angle, the corner along the front of the cowl 52 where the bending guide 58 is formed comes in contact with the rear edge of the hood 10B. Therefore, even with further pressure from the airbag 4, the cowl 52 is stopped by the rear edge of the hood 10B and is thus prevented from further opening. Besides the aforementioned arrangement, another arrangement may be employed. For example, the rear end portion of the cowl 52 may be connected to another vehicle body member by tethers (not shown), whereby the tethers stops further opening of the cowl 52 when the cowl 52 opens at the predetermined angle. Further another arrangement for regulating the opening angle of the cowl 52 may be employed.

Therefore, as the airbag 4 starts to be inflated, the cowl 52 is bent at the bending guide 58 with the pressure from the airbag 4 so as to open upwardly. When the cowl 52 opens at the predetermined angle, the cowl 52 hangs over the airbag 4, being deployed, from the front side of the vehicle so as to regulate the deployment direction of the airbag 4 to deflect the deployment toward the windshield 20.

It should be noted that normally the cowl 52 closes the opening 50 and substantially extends in the horizontal direction to have its upper surface flush with the upper surface of the hood 10B.

The other components of the inflatable external airbag system 1 and the motor vehicle of this embodiment are the same as those of the aforementioned inflatable external airbag system 1 and the motor vehicle. In the aforementioned embodiment, the cowl 52 may compose a front portion of the cowl top 22.

As described above, the present invention can provide an inflatable external airbag system which can securely deploy its airbag into a desired position from a rear portion of a hood along a windshield with little or no influence of wind direction and/or wind pressure around the top of a running vehicle.

The priority application, Japanese Patent Application No. 2002-25881 filed Feb. 1, 2001, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An inflatable external airbag system for a vehicle having a hood including a front and rear thereof, and a windshield adjacent the rear of the hood, the inflatable external airbag system comprising:

an airbag for being deployed along the vehicle windshield; and a rear portion of the hood closer to the rear of the hood than the front thereof with the airbag deploying from the hood rear portion toward the generally adjacent vehicle windshield to minimize wind and air pressure influences in securely deploying the airbag along the windshield, wherein the airbag is positioned under the hood rear portion, and the hood rear portion comprises a regulating member that deflects the airbag toward the windshield when the airbag deploys.

2. An inflatable external airbag system for a vehicle having a hood including a front and rear thereof, and a windshield adjacent the rear of the hood, the inflatable external airbag system comprising:

an airbag for being deployed alone the vehicle windshield; and a rear portion of the hood closer to the rear of the hood than the front thereof with the airbag deploying from the hood rear portion toward the generally adjacent vehicle windshield to minimize wind and air pressure influences in securely deploying the airbag alone the windshield, wherein the hood further includes a cowl at the rear thereof, and the cowl comprises a regulating member that pivots upwardly to deflect the airbag toward the windshield when the airbag deploys.

* * * * *

UNITED STATES PATENT AND TRADEMARK OFFICE
CERTIFICATE OF CORRECTION

PATENT NO. : 6,857,495 B2
DATED : February 22, 2005
INVENTOR(S) : Tomohiro Sawa

It is certified that error appears in the above-identified patent and that said Letters Patent is hereby corrected as shown below:

<u>Column 8,</u>
Lines 24 and 31, change "alone;" to -- along. --

Signed and Sealed this

Seventh Day of June, 2005

JON W. DUDAS
*Director of the United States Patent and Trademark Office*